April 26, 1927.
E. BARTH
PLUMB BOB
Filed May 18, 1926
1,626,130
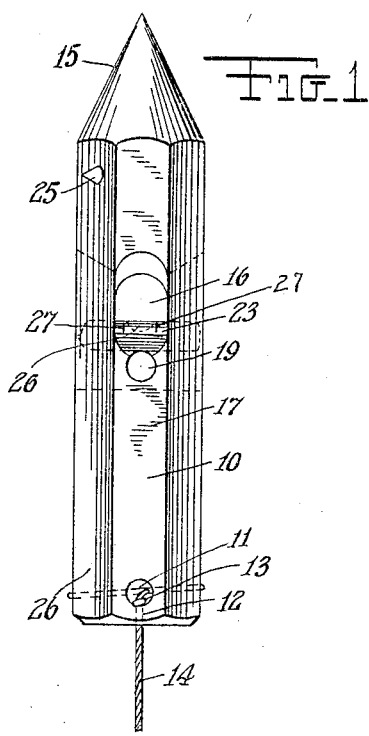
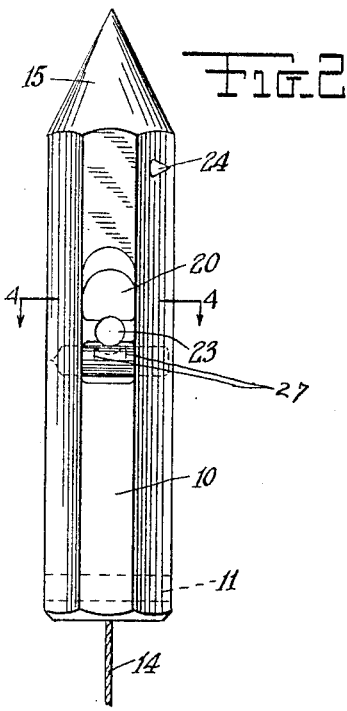
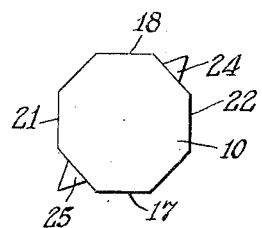
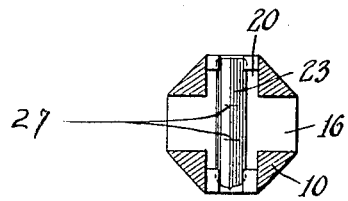
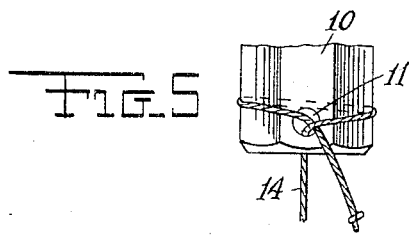
INVENTOR
*E. Barth*
BY
ATTORNEY Patented Apr. 26, 1927.

1,626,130

UNITED STATES PATENT OFFICE.

ERICH BÄRTH, OF NEW YORK, N. Y.

PLUMB BOB.

Application filed May 18, 1926. Serial No. 109,839.

The main object of this invention is to provide a tool for plumbing vertical surfaces. It constitutes a distinct improvement over the ordinary plumb, inasmuch as with this tool, only one man is required for determining a plumb, whereas with the ordinary type of plumb, two men are required, one to hold the end of the plumb line while the other steadies the plumb itself. The invention uses an ordinary plumb which serves as a housing for levels whose bubbles indicate vertical alignment of the axis of the plumb with the point of securement of the plumb line.

The above and other objects will become apparent from the description below, in which characters of reference refer to like-named parts in the drawing.

Referring briefly to the drawing, Figure 1 is a front elevational view of the plumb.

Figure 2 is a side elevational view of Figure 1.

Figure 3 is a top plan view of Figure 1.

Figure 4 is a cross sectional view taken on line 4—4 of Figure 2.

Fig. 5 is a fragmentary view of the lower end of the plumb bob, showing the manner of securing the line thereto.

Referring in detail to the drawing, the numeral 10 indicates the body of the plumb. This body is octagonal in outline and at its lower end has an opening 11 which passes diametrically thru the body from one surface to the opposite surface. A smaller opening 12 is bored axially into the body 10 of the plumb and serves as a guide for the knotted end 13 of a lead line 14. The upper end of the body is formed into a conical tip 15 whose apex lies in the longitudinal axis of the body. At a position intermediate the length of the body, a transverse aperture 16 is formed. This aperture extends entirely thru the body diametrically from one surface 17 to the opposite surface 18. At the bottom of this aperture, a level glass 19 filled with the usual liquid is mounted. This level glass extends the entire width of the plumb body. An additional aperture 20 passes thru the body from the surface 21 to the surface 22. The second-named aperture is at right angles to and intersects the first-named aperture 16. In the bottom of the second-named aperture, an additional level glass 23 is mounted in a suitable manner so that the same cannot move or be displaced. These level glasses 19 and 23 are positioned substantially at right angles to each other so that a reading in two planes may be had. Near the upper end of the body 10 below the tip 15, pintles 24 and 25 are anchored. These pintles extend diametrically outward from opposite surfaces 26 and are held between the fingers when suspending the plumb.

The plumb is used for levelling or indicating a true vertical line and is especially useful in building trades. Assuming that a wall is to be constructed at a certain position, the position of the wall is indicated by a marker and the free end of the lead line 14 is attached to the floor or held down aligned with the mark made by either a weight or any other securing means. The plumb itself is then lifted to the position near the ceiling and is suspended by holding the pintles 24 and 25 between two fingers so that the plumb may easily be trunnioned. Suspending the plumb between the fingers so that the tip 15 passes some point on the ceiling, the plumb is shifted about until the bubbles 26 in each level glass are read and register between the graduations 27 marked on the surfaces of the level glasses 23 and 19. When both bubbles register between said graduations, it indicates that the point at which the plumb touches the ceiling lies vertically above the given point on the floor. The plumbing operation, as stated, may be done by a single operator, whereas, at the present time with the ordinary type of plumb, two men are required, one to shift the free end of the lead line to the ceiling while the other steadies the plumb suspended from the lead line until the tip of the plumb lies with the mark on the floor. This device proceeds to accomplish its purpose in a reverse manner to that of the usual type of plumb inasmuch as the lead line is secured to the floor and the plumb is suspended or held in raised position to ultimately mark the ceiling with the tip of the plumb.

It is to be noted that certain changes in form and construction may be made without departing from the spirit and scope of the invention.

I claim:—

1. A plumb comprising an octagonal body, a conical tip at the upper end of said body, a lead line normally suspended from said plumb, a pair of apertures extending diametrically thru the body with their respective axes falling in intersecting planes, a level mounted lengthwise in each aperture, said levels indicating the true vertical alignment of the longitudinal axis of said plumb, and means on said body for suspending said plumb so that the same hangs vertically.

2. A plumb comprising an octagonal body, a conical tip at the upper end of said body, a lead line normally suspended from said plumb, a pair of apertures extending diametrically thru the body with their axes falling in intersecting planes, a level mounted lengthwise in each aperture, said levels indicating the true vertical alignment of the longitudinal axis of said plumb, means on said body for suspending said plumb so that the same hangs vertically, said means comprising tapering pintles extending diametrically from opposite sides of the body above the levels and below the tip.

In testimony whereof I affix my signature.

ERICH BÄRTH.